Oct. 25, 1966     G. KAVANAGH     3,280,724
GRILL
Filed July 21, 1965     2 Sheets-Sheet 1
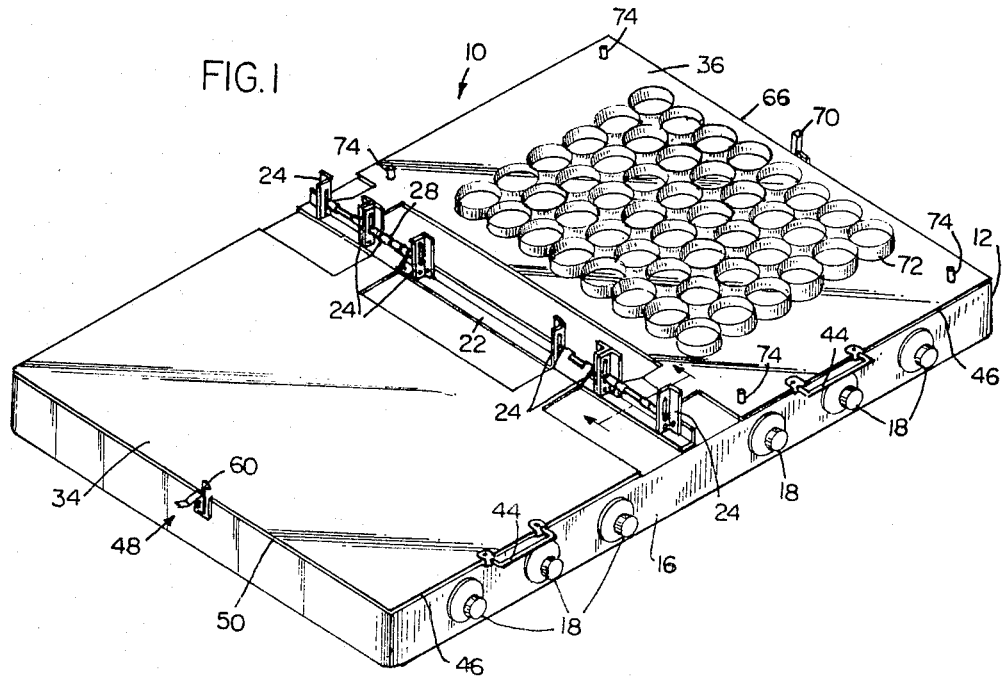
FIG. 1
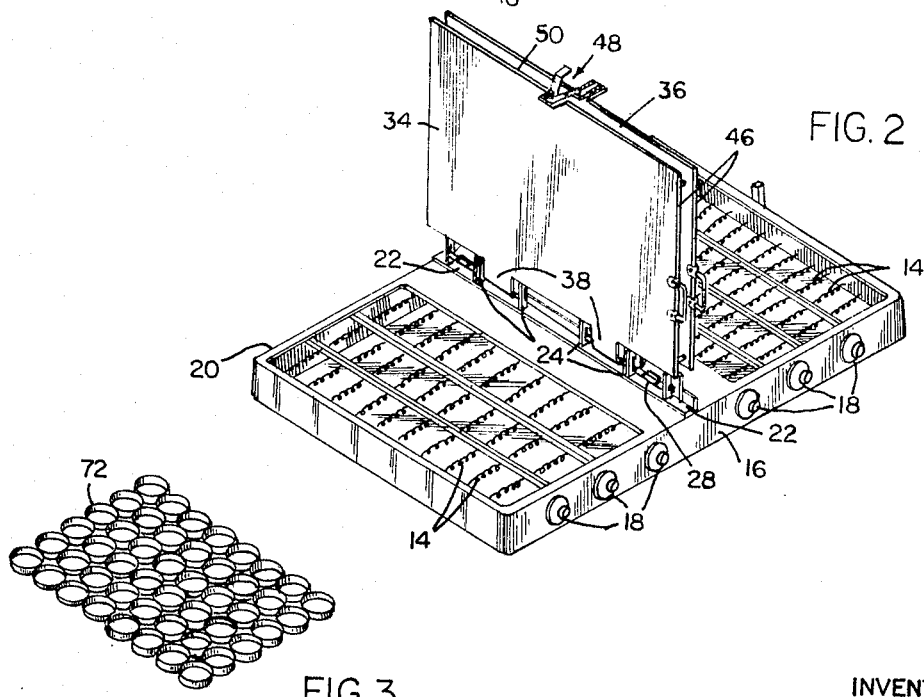
FIG. 2
FIG. 3
INVENTOR
GEORGE KAVANAGH
BY *James B. Tiffany Jr.*
ATTORNEY Oct. 25, 1966
G. KAVANAGH
3,280,724
GRILL
Filed July 21, 1965
2 Sheets-Sheet 2
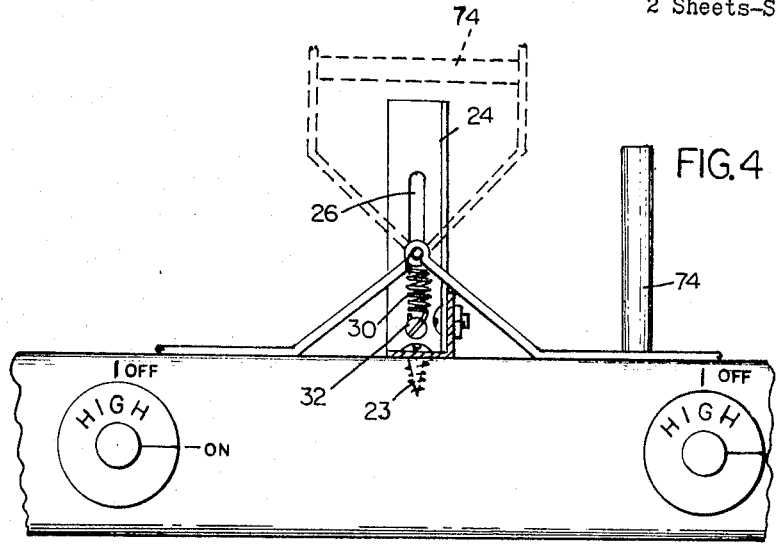
FIG. 4
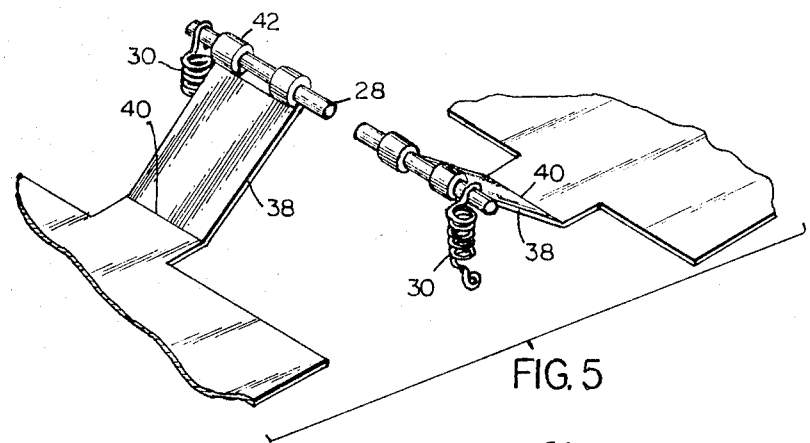
FIG. 5
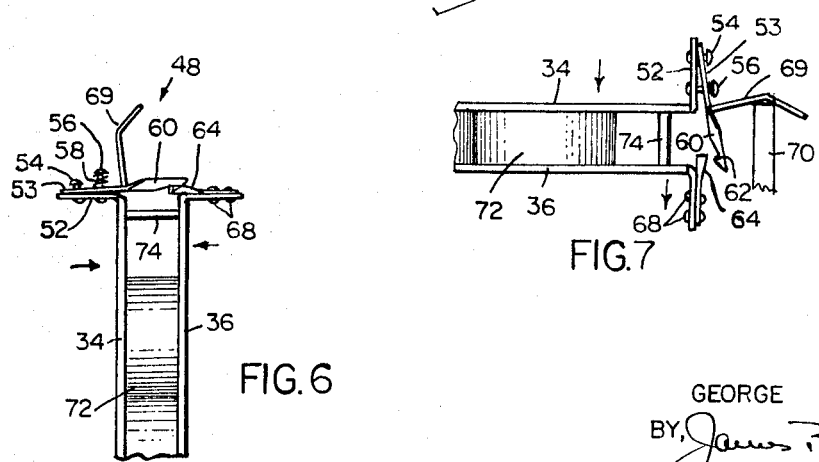
FIG. 6
FIG. 7
INVENTOR
GEORGE KAVANAGH
BY James B. ...
ATTORNEY United States Patent Office 3,280,724
Patented Oct. 25, 1966

3,280,724
GRILL
George Kavanagh, 185 Pleasant St., Milton, Mass.
Filed July 21, 1965, Ser. No. 473,710
1 Claim. (Cl. 99—424)

This invention relates generally to cooking devices and more particularly to a griddle adapted for cooking english muffins, crumpets, waffles or the like on the surface thereof.

The baking industry in recent years in responses to the growing demand for its products have developed in conjunction with machine designers large automatic machines which will automatically produce large volumes of bakery products in short periods of time. This has proved to be advantageous where there is a large demand or where the finished product is frozen for distribution at a later date. However, certain bakery products are not adapted for the freezing and thawing cycle and the small producer, through economic circumstances can neither afford the initial investment in the automatic machines nor can afford to run the large machine at a reduced capacity. Quality control studies have proved that the automatic machines cannot be efficiently operated below a certain rated capacity due to heat distribution factors.

Furthermore with small bakery operations size of the machines is a limiting factor.

Therefore, it is one object of this invention to provide a griddle having self-contained heating elements adapted for use on a counter-top or the like.

It is another object of this invention to provide an improved griddle having pivotable surface members adapted to be positioned in juxtaposed relationship.

It is a further object of this invention to provide an improved griddle having a pair of hinged surface members and a series of joined rings adapted to be positioned on one surface and transferrable to the other surface.

It is still another object of this invention to provide an improved griddle wherein a series of joined rings containing edibles may be transferred from one portion of the cooking surface to another surface so that both tops and bottoms of the edibles may have equal exposure to the heat.

Other objects of this invention will in part, be obvious, and will in part, appear hereinafter.

Broadly stated one feature of this invention is to provide an improved griddle wherein numbers of materials such as hamburgers, english muffins, scones, waffles and like materials may be grilled on one side and then quickly and easily reversed and grilled on the other side.

To the accomplishment of this and the foregoing related ends, the present invention then consists of the means hereinafter fully described and particularly pointed out in the claim, the annexed drawings and the following description setting forth in detail certain means in the carrying out of the invention, such disclosed means illustrating, however, but one of the various ways in which the principles in the invention may be employed.

In the drawings—

FIG. 1 is a view in perspective of the apparatus embodying the features of this invention.

FIG. 2 is a view in perspective of the apparatus with the cooking areas containing the rings at the mid-point of the transfer.

FIG. 3 is a view in perspective of the joined rings.

FIG. 4 is a fragmentary view in front elevation illustrating the hinge detail.

FIG. 5 is a partial view in perspective of the hinge structure.

FIG. 6 is a view in side elevation of a locking device for securing the surface members together.

FIG. 7 is a view in front elevation of the tripping machine for this locking device.

Reference is now to be had to the drawings wherein an illustrative embodiment of the improved griddle, a construction made in accordance with the present invention and designated by the reference numeral 10 as shown. The griddle 10 consists primarily of a cabinet 12 containing heating elements 14 which may be gas fired or contain electrical heating elements but for purposes of simplicity in illustration they have been shown as electrical wires. On the forward edge 16 of the cabinet 12 are positioned a series of heating controls 18 to regulate the degree of heat generated by the heating elements 14. At the approximate middle of the upper surface of the cabinet 12 and extending from the rear 20 to forward edge 16 is a rigid plate 22 secured to the cabinet by screws 23 bisecting the cabinet into two equal portions. Extending upwardly and substantially at right angles to the plate 22 and at laterally spaced intervals to each other are a series of support members 24. Each of said support members 24 has a vertically extending slot 26 formed therein. Positioned within the slots 26 and extending between pairs of support members 24 are a series of center bars 28, each bar 28 defining an independent rotatable axis between a pair of support members.

At each end of each of the bars 28 spring members 30 extend downwardly and are secured to the angle members by screws 32 for a purpose to be set forth more fully hereinafter. Griddle members 34 and 36 are disposed on the upper surface of the cabinet 12 providing a closure thereto. Each of said griddle members 34 and 36 are secured to the center bars 28 by tongue members 38 which are integral with the griddle members. The tongue members 38 have a bend 40 adjacent the distal end 42 thereof so that the tongues are inclined upwardly in the direction of the center bars 28 with the distal ends 42 having a tubular conformation with an internal diameter greater than the external diameter of the center bars 28. The tubular conformation of the distal ends 42 are so positioned that the center bars 28 may be inserted there through so that the griddle members 34 and 36 may be rotated thereon. Handles 44 are secured to one edge 46 of the griddle members 34 and 36 to enable an operator to rotate the griddle members about the center bars 28 into juxtaposed relationship wih each other.

As illustrated in FIGURES 1, 6 and 7 a locking device 48 is secured to an edge 50 of the griddle member 34. The locking device 48 comprises a flat rigid member 52 angularly extending from the griddle member 34 and an arm 53 extending parallel thereto and secured to the member 52 by means of screws 54 and 56 in such a manner as to be adjustable thereon. The arm 53 is spring biased into engagement with the member 52 by means of a spring 58 so as to be movable toward and away from the member 52. The arm 53 extends upwardly beyond the upper surface of the griddle member and has the distal end tapered to provide a leading edge 60. A notch 62 is formed on the leading edge 60 adjacent the distal end for a purpose to be set forth more fully hereinafter. A catch member 64 is disposed on the edge 66 of the grill member 36 and secured thereto by suitable screws 68 and is adjustable toward and away from the surface of the grill 36 by any suitable means. The notch 62 of the arm 53 is adapted for cooperative engagement with the catch member 64 so that the griddle members 34 and 36 may be maintained in a juxtaposed relationship. A release mechanism is provided to disengage the griddle members 34 and 36 from each other and consists of projecting member 69 extending angularly outwardly from the arm 53 and integral therewith and adapted to bear against a stop member 70 extending upwardly from the edge 66 of the cabinet.

Adapted to be used with the improved griddle 10 are a plurality of rings 72 each joined at points on there circumference to other rings providing a rigid structure. The group of rings so joined having a surface area less than that of one of the griddle members 34 and 36.

In operation the device is activated by energizing the heating elements 14 and controlling the heat generated thereby through the controls 18. The heat thus generated is transmitted to the griddle members 34 and 36. When the griddle members 34 and 36 have reached the optimum temperature for cooking the mass of rings 72 not containing the materials to be grilled is placed on one griddle surface 34. The ingredients to be grilled are then inserted into the rings. After a predetermined cooking period the other griddle member 36 is rotated on the center bars 28 into a juxtaposed relationship with upper surface of the rings 72 and prevented from actual contact with the rings by the pins 74. The locking device 48 by means of the leading surface allows the arm 53 to be cammed away against the tension of the spring 58 as shown in FIGURE 7 until the notch portion 62 engages the catch member 64. In this manner by utilizing the handles 44 as shown in FIGURE 2 both griddle members 34 and 36 having the rings 72 sandwiched therebetween may be rotated on the center bars 28 onto the opposite heating elements where the projecting arm 69 abuts the stop member 70 disengaging the notch 62 from the catch member 68 and releasing the two griddle members 34 and 36. In this manner the rings 72 are inverted and the ingredients therein contained may be cooked on their reverse side while the rings 72 are thus positioned in the griddle 36 a second set of rings (not shown) may be placed on the griddle 36 and the process repeated.

While there have been described herein what are at present considered preferred embodiments of the invention it will be obvious to those skilled in the art that modifications and changes may be made therein without departing from the essence of this invention. It is therefore to be understood that the exemplary embodiments are illustrative and not restrictive of this invention, the scope of which is defined in the appended claim and that all modifications that come within the meaning and range of equivalency of the claim are intended to be included therein.

I claim:

A grill comprising in combination a cabinet, said cabinet bifurcated by a plate member, said plate member having a plurality of vertically extending slotted supports spaced from each other, a pair of co-planar griddle members defining the upper surface of said cabinet, said griddle members having hinge members at their inner edges, said hinge members including bar members extending between pairs of said support members defining independent rotatable axes for said hinge members, said bar members normally biased downwardly by spring means secured to said bar members, means for pivoting said griddle members into juxtaposed relationship with each other on said bar members and latch means extending from one of said griddle members adapted for cooperative locking engagement with the other of said griddle members to maintain said griddle members in a parallel spaced relationship during a pivotable moment.

References Cited by the Examiner

UNITED STATES PATENTS

| | | | |
|---|---|---|---|
| 61,478 | 1/1867 | Smith | 99—377 X |
| 316,741 | 4/1885 | Carpenter | 99—424 |
| 740,050 | 9/1903 | Shults. | |
| 1,661,294 | 3/1928 | Lemaster | 99—378 X |
| 1,678,690 | 7/1928 | Connell | 99—377 X |
| 1,907,441 | 5/1933 | Pickering et al. | 99—424 |
| 3,223,025 | 12/1965 | Johns | 99—377 |

FOREIGN PATENTS 654,971 1/1938 Germany.

WALTER A. SCHEEL, *Primary Examiner.*

BILLY J. WILHITE, *Examiner.*